(12) United States Patent
Overton

(10) Patent No.: US 9,069,477 B1
(45) Date of Patent: Jun. 30, 2015

(54) REUSE OF DYNAMICALLY ALLOCATED MEMORY

(75) Inventor: Adam J. Overton, Redmond, WA (US)

(73) Assignee: Amazon Technologies, Inc., Reno, NV (US)

( * ) Notice: Subject to any disclaimer, the term of this patent is extended or adjusted under 35 U.S.C. 154(b) by 148 days.

(21) Appl. No.: 13/161,844

(22) Filed: Jun. 16, 2011

(51) Int. Cl.
G06F 3/06 (2006.01)
G06F 17/30 (2006.01)
G06F 11/14 (2006.01)

(52) U.S. Cl.
CPC ........ *G06F 3/0641* (2013.01); *G06F 17/30156* (2013.01); *G06F 17/3015* (2013.01); *G06F 11/1453* (2013.01)

(58) Field of Classification Search
None
See application file for complete search history.

(56) References Cited

U.S. PATENT DOCUMENTS

| | | | | |
|---|---|---|---|---|
| 4,535,404 | A * | 8/1985 | Shenk | 710/59 |
| 5,239,639 | A * | 8/1993 | Fischer et al. | 713/600 |
| 5,721,872 | A * | 2/1998 | Katsuta | 711/163 |
| 5,937,425 | A * | 8/1999 | Ban | 711/103 |
| 6,085,282 | A * | 7/2000 | Hansen et al. | 711/103 |
| 6,374,339 | B2 * | 4/2002 | Iivonen | 711/170 |
| 6,779,095 | B2 * | 8/2004 | Selkirk et al. | 711/165 |
| 6,990,667 | B2 * | 1/2006 | Ulrich et al. | 718/105 |
| 7,047,382 | B2 * | 5/2006 | Geiger et al. | 711/165 |
| 7,103,713 | B2 * | 9/2006 | Saika et al. | 711/112 |
| 7,197,620 | B1 * | 3/2007 | Adcock | 711/202 |
| 7,216,367 | B2 * | 5/2007 | Szor | 726/25 |
| 7,287,141 | B2 * | 10/2007 | Nakazawa et al. | 711/165 |
| 7,337,267 | B1 * | 2/2008 | Pereira et al. | 711/108 |
| 7,395,378 | B1 * | 7/2008 | Pendharkar et al. | 711/144 |
| 7,441,093 | B2 * | 10/2008 | Ganjoo et al. | 711/165 |
| 7,457,934 | B2 * | 11/2008 | Yagawa | 711/170 |
| 7,721,042 | B2 * | 5/2010 | Cypher | 711/108 |
| 7,925,683 | B2 * | 4/2011 | Jain et al. | 711/162 |
| 2002/0087786 | A1 * | 7/2002 | Burton et al. | 711/112 |
| 2002/0120824 | A1 * | 8/2002 | Hooper, III | 711/202 |
| 2004/0098544 | A1 * | 5/2004 | Gaither et al. | 711/154 |
| 2008/0082738 | A1 * | 4/2008 | Cypher et al. | 711/108 |
| 2008/0155358 | A1 * | 6/2008 | Arataki et al. | 714/47 |
| 2008/0276049 | A1 * | 11/2008 | Kajigaya | 711/151 |
| 2009/0063883 | A1 * | 3/2009 | Mori | 713/324 |
| 2009/0083503 | A1 * | 3/2009 | Li et al. | 711/162 |
| 2009/0089483 | A1 * | 4/2009 | Tanaka et al. | 711/103 |
| 2009/0193219 | A1 * | 7/2009 | Ohira et al. | 711/170 |
| 2009/0204718 | A1 * | 8/2009 | Lawton et al. | 709/230 |
| 2010/0122052 | A1 * | 5/2010 | Waldspurger et al. | 711/162 |

(Continued)

OTHER PUBLICATIONS

David Geer, "Reducing The Storage Burden Via Data Deduplication", Computer, Dec. 2008, vol. 41, Issue 12, pp. 15-17.*

(Continued)

*Primary Examiner* — Christopher D Birkhimer
(74) *Attorney, Agent, or Firm* — Lee & Hayes, PLLC

(57) ABSTRACT

Overall memory requirements are minimized by performing copy on write and collapse on write operations using memory pointers when storing data within memory pages. Multiple memory pointers may refer to a primary page storing a definitive copy of data. When that data is to be modified, a copy on write operation creates a second copy in another memory page which may then be modified and updates memory pointers accordingly. When data within two or more memory pages is identical to data within a primary page, a collapse on write operation updates memory pointers to refer to the primary page and de-allocates the duplicative and now unused memory pages.

24 Claims, 9 Drawing Sheets

(56) References Cited

U.S. PATENT DOCUMENTS

| | | | |
|---|---|---|---|
| 2010/0161608 A1* | 6/2010 | Jain et al. | 707/737 |
| 2010/0161685 A1* | 6/2010 | Jain et al. | 707/812 |
| 2010/0223432 A1* | 9/2010 | Eidus et al. | 711/148 |
| 2010/0299490 A1* | 11/2010 | Attarde et al. | 711/162 |
| 2010/0332401 A1* | 12/2010 | Prahlad et al. | 705/80 |
| 2010/0332454 A1* | 12/2010 | Prahlad et al. | 707/654 |
| 2010/0332479 A1* | 12/2010 | Prahlad et al. | 707/741 |
| 2011/0022718 A1* | 1/2011 | Evans et al. | 709/231 |
| 2011/0022825 A1* | 1/2011 | Spackman | 712/240 |
| 2011/0055471 A1* | 3/2011 | Thatcher et al. | 711/114 |
| 2011/0060882 A1* | 3/2011 | Efstathopoulos | 711/162 |
| 2011/0131387 A1* | 6/2011 | Bacik | 711/171 |
| 2011/0138144 A1* | 6/2011 | Tamura et al. | 711/166 |
| 2011/0161619 A1* | 6/2011 | Kaminski et al. | 711/207 |
| 2011/0178972 A1* | 7/2011 | Navarro et al. | 706/47 |

OTHER PUBLICATIONS

Kostas Pagiamtzis et al., Content-Addressable Memory (CAM) Circuits and Architectures: A Tutorial and Survey, Mar. 2006, IEEE Journal of Solid-State Circuits, vol. 41, No. 3, pp. 712-727.*

SNIA, "Pointer Remapping", Jul. 20, 2002, pp. 1-9, http://web.archive.org/web/20020720152513/http://www.snia.org/education/dictionary/p/.*

Fujitsu, "White Paper: ETERNUS CS800—Data Deduplication Background", 2010, pp. 1-8, http://globalsp.ts.fujitsu.com/dmsp/Publications/public/wp_eternus_cs800_data_deduplication_background.pdf.*

Webopedia, "Data Deduplication", Sep. 13, 2006, pp. 1-2, http://web.archive.org/web/20060913030559/http://www.webopedia.com/TERM/D/data_deduplication.html.*

Stephen J. Bidelow et al., "Data Deduplication (Intelligent Compression Or Single-Instance Storage)", Jul. 2010, pp. 1-19, http://searchstorage.techtarget.com/definition/data-deduplication.*

SNIA, "Copy On Write", Jul. 22, 2002, pp. 1-12, http://web.archive.org/web/20020722072415/http://www.snia.org/education/dictionary/c/.*

Charles M. Kozierok, "Real and Virtual Memory", Sep. 1, 2000, pp. 1-2, http://web.archive.org/web/20000901234351/http://www.pcguide.com/ref/ram/sizeVirtual-c.html.*

Webopedia, "Virtual Memory", Apr. 11, 2001, pp. 1-2, http://web.archive.org/web/20130413121515/http://www.webopedia.com/Term/V/virtual_memory.html.*

Webopedia, "Paging", Aug. 9, 2002, pp. 1-1, http://web.archive.org/web/20020809123737/http://www.webopedia.com/TERM/P/paging.html.*

Webopedia, "Page", Apr. 11, 2001, pp. 1-2, http://web.archive.org/web/20010411032818/http://www.webopedia.com/TERM/p/page.html.*

Arcangeli, et al., "Increasing memory density by using KSM", Red Hat Inc., Linux Symposium, Jul. 13-17, 2009, 12 pages.

* cited by examiner

REUSE OF DYNAMICALLY ALLOCATED MEMORY

BACKGROUND

Devices ranging from graphics cards to cloud computing servers executing virtual servers use computer readable storage media (CRSM) to store data. The CRSM may include random access memory (RAM), magnetic memory, optical memory, and so forth. Regardless of the physical format, such memory is finite. Blocks of memory may be designated as pages, and data stored within those pages. Pages may be dynamically allocated to different processes over time, to meet the changing needs of those processes.

Upon examining the memory contents of conventional systems, at various times the contents of many pages would be found to be identical. For example, on a server hosting hundreds of virtual instances of the same application, at a given time several users may be viewing the same bitmap of a splash screen resulting in that same bitmap being stored in hundreds of different memory pages. This duplication of identical data within the memory results in an undesirable increase in memory usage.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

Computing devices store data including executable code and user information in a variety of computer readable storage media (CRSM), or memory. The memory accessible to a given device, while large, is finite. The memory may be divided into blocks of memory known as pages. Each page may be used to store data. Pointers may be used to refer a process such as an application or portion of an application to a particular page of memory. These pointers comprise addresses for actual memory locations within particular memory hardware or virtual memory locations.

In many situations, processes running on the computing device may store the same data in several pages. For example, a server executing three instances of the same application may store three copies of the same initial environment variables such that each instance has its own page. While workable, this is very memory intensive.

A reduction in memory usage is possible by adjusting pointers such that data in otherwise identical pages is shared among processes. Continuing the example, a single page may store the initial environment variables. That single page may then be referred to by three pointers, one associated with each instance of the application. Thus, instead of having three duplicate copies, a single copy is stored in memory.

Sharing the page may introduce problems when one of the instances needs to modify data within the page. From the example above, a user changing a setting in one instance may not wish to affect the setting in another user's instance. When a shared page is accessed and data within is to be changed, a copy on write operation makes a copy of the page which the pointer was pointing to, updates the pointer associated with that process to point to the second page, and then modifies the data within the second page copy. The copy on write operation allows for the initial sharing of common pages, but quickly leads to growth in memory usage.

Described herein are techniques and systems configured to allow for the reuse of dynamically allocated memory. Data in memory pages may be shared and utilize the copy on write operation to expand the pages as changes are made. Conversely, memory pages which contain data deemed to be identical are consolidated using a collapse on write operation, reducing memory page usage. Also described are techniques for reducing memory usage by providing an initialized memory page which is referred to via pointers. Rather than filling memory with many initialized memory pages, pointers refer to a representative primary initialized memory page.

Illustrative Environment

Figure 1:
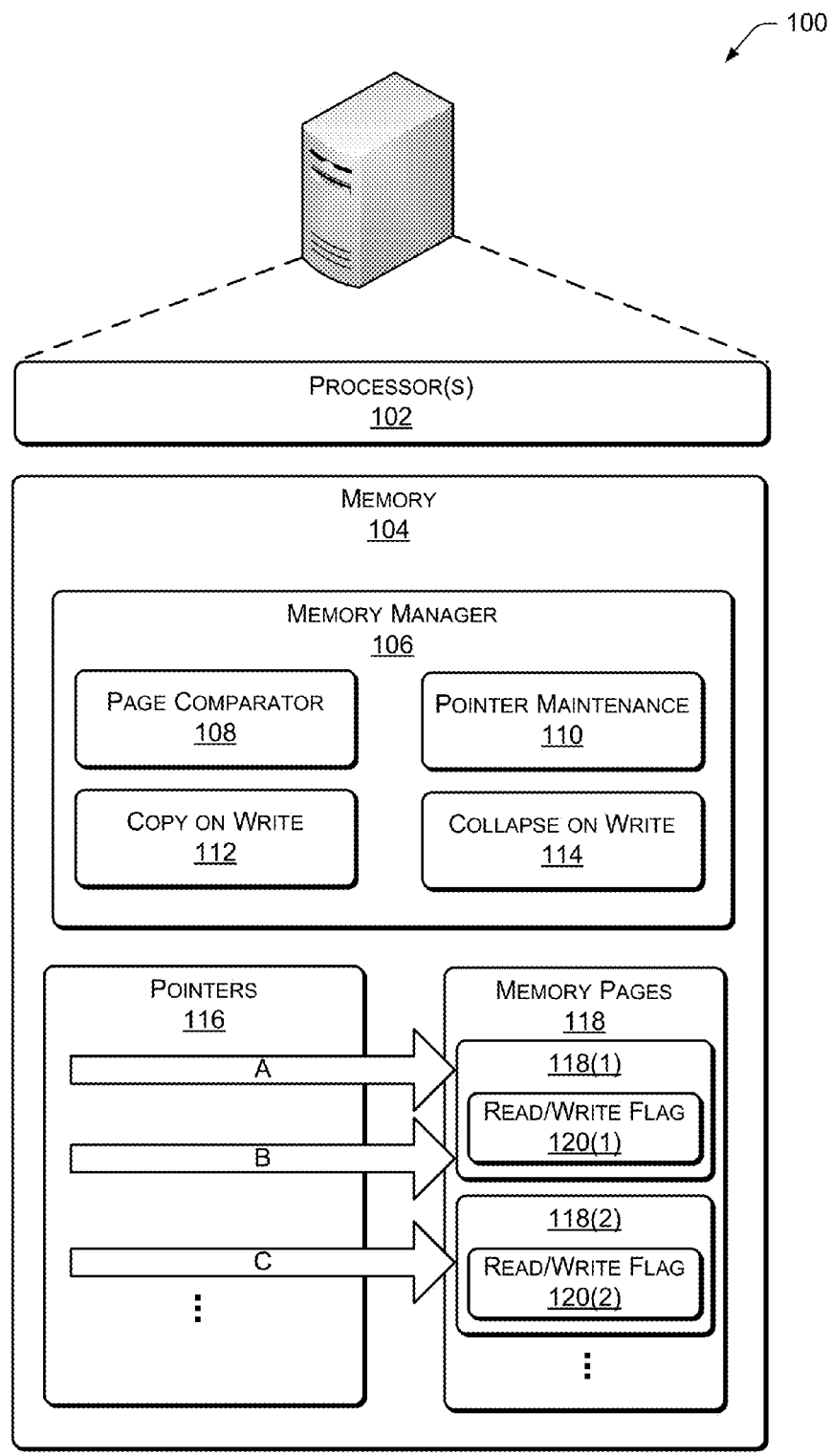
FIG. 1 is a block diagram of an illustrative device using a memory manager configured to reuse dynamically allocated memory using a collapse on write operation.

FIG. 1 is a block diagram of an illustrative device 100 using a memory manager configured to reuse dynamically allocated memory. This device 100 may include one or more processors 102 configured to execute instructions. This processor may be general purpose processor, application specific integrated circuit, graphics processor, and so forth. As illustrated, the processor 102 is coupled to a memory 104.

The memory 104 may include computer-readable storage media ("CRSM"). The CRSM may be any available physical media accessible by a computing device to implement the instructions stored thereon. CRSM may include, but is not limited to, random access memory ("RAM"), read-only memory ("ROM"), electrically erasable programmable read-only memory ("EEPROM"), flash memory or other memory technology, compact disk read-only memory ("CD-ROM"), digital versatile disks ("DVD") or other optical disk storage, magnetic cassettes, magnetic tape, magnetic disk storage or other magnetic storage devices, or any other non-transitory medium which can be used to store the desired information and which can be accessed by a computing device.

The memory 104 may store a memory manager 106 for execution on the processor 102. The memory manager 106 is configured to reuse dynamically allocated memory, such as memory pages within a virtual memory system. The memory manager 106 may include several modules, including a page comparator module 108, a pointer maintenance module 110, a copy on write module 112, and a collapse on write module 114.

The page comparator module 108 is configured to determine when two or more memory pages contain data deemed to be identical. This comparison may include examination of hashes, bit level comparisons, and so forth.

In some implementations pages may be deemed identical when a match of the contents of the memory pages indicates the contents are the same, or when the match exceeds a pre-determined threshold or position within the memory. For example, multiple memory pages may differ by a single bit at the end of those memory pages and still be determined to be identical for the processes and techniques described herein.

In other implementations a portion of each page may be allocated for data storage. Thus pages may be deemed identical when the contents of those portions are the same while disregarding the remainder of the pages. The comparison process is described below in more detail with regards to FIG. 7.

In some implementations one or more of the functions of the comparator module 108 may be provided via hardware, such as content addressable memory. For example, content addressable memory (CAM) may be configured to store a hash value and page address for pages stored in random access memory. The CAM may then be queried and used to find the page addresses for matching memory pages.

The pointer maintenance module 110 is configured to maintain a data structure containing one or more memory pointers. These pointers provide a page address which refers a process to a particular page within the memory 104. Pointers are described in more detail below.

The copy on write module 112 provides the copy on write operation. During a copy on write operation, contents of an existing memory page are copied to a second memory page, and the second memory page may be updated. The copy on write operation leaves the original page intact and unmodified. As part of the copy on write operation, pointers may be updated to refer the calling process to the second memory page. The copy on write operation is discussed in more detail below with regards to FIG. 2.

The collapse on write module 114 provides the collapse on write operation. When a write would result in a page having duplicate data with an existing memory page, the collapse on write operation updates pointers such that the pointers refer to a single memory page. The duplicate memory pages may then be de-allocated. The collapse on write operation is also discussed below in more detail below.

In some implementations, the processes described herein as provided by the memory manager 106 may be considered to operate where the translation between virtual memory location and physical memory locations within particular memory hardware occurs. The copy on write modules 112 and the collapse on write modules 114 may thus be configured to intercept and modify calls to memory pages such that an application executing on the processor 102 is unaware of the copy or collapse operations.

As illustrated, the memory 104 may also store one or more memory pointers 116. These pointers 116 associate a particular process with a location within memory, such as a particular memory page. In these figures, pointers are designated with arrows A, B, C, . . . X. The total number of pointers 116 available within the system 100 may be determined by programmatic or hardware limitations. In some implementations, pointers may be associated with one or more processes, and may refer to one or more memory pages. In some implementations, pointers may comprise a physical memory address or a virtual memory address.

Memory pages 118 are blocks of memory which have been allocated for the storage of data. These blocks may be contiguous blocks in some instances. The memory pages 118(1), 118(2), . . . (X) may be associated with particular physical addresses within the memory 104 hardware. The memory pages 118 may also be virtual memory addresses, configured to provide a memory space across one or more different physical memory devices.

In some implementations, the memory pages 118 may have an associated read/write flag 120. This flag may be used to designate when a particular memory page is being read from or actively written to. This designation may be made by monitoring accesses to the page over a pre-determined interval. This pre-determined interval may be a time such as 10 nanoseconds, number of memory access cycles such as the last five read/write cycles, and so forth. In another implementation, the pre-determined interval may be a time-out timer, configured to reset to a pre-determined value upon the occurrence of some action, such reading or writing to a memory page.

Figure 2:
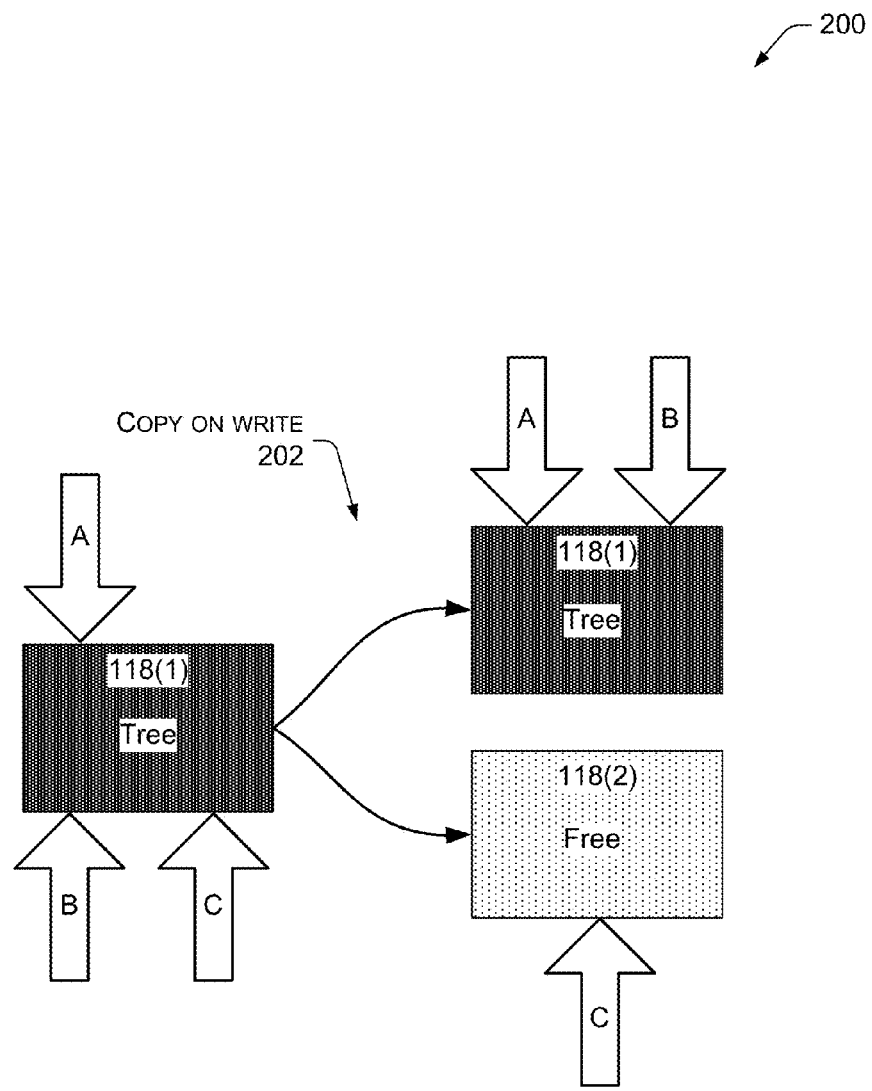
FIG. 2 illustrates a copy on write operation and corresponding update of memory pointers.

FIG. 2 illustrates a copy on write operation 200. The contents of memory pages designated as "copy on write" may be assumed to not change in most instances, at least until the copy on write designation is removed. The designation of the memory page as a "copy on write" page thus protects the contents of the memory page from change. Multiple pointers may refer to this page, but any attempt to change until the designation is removed will result in a copy and resulting changes to the copy with an update to the pointer.

In this illustration the memory page 118(1) is shown containing the data "Tree". Three pointers 116 designated A, B, and C refer to this memory page. In this illustration, suppose that the process associated with pointer C will change the data within the memory page 118(1). A copy on write operation 202 takes place, leaving the memory page 118(1) intact and creating a copy of the memory page 118(2). The A and B pointers remain associated with the original memory page 118(1) while the C pointer now refers to the memory page 118(2). The contents of the memory page 118(2) may now be modified by the process associated with pointer C. As shown here, the data within the memory page 118(2) is now "Free".

As described above, as individual processes such as application instances in a virtual server environment continue to make changes to memory pages 118, the copy on write operation may result in significantly increased memory page usage.

Figure 3:
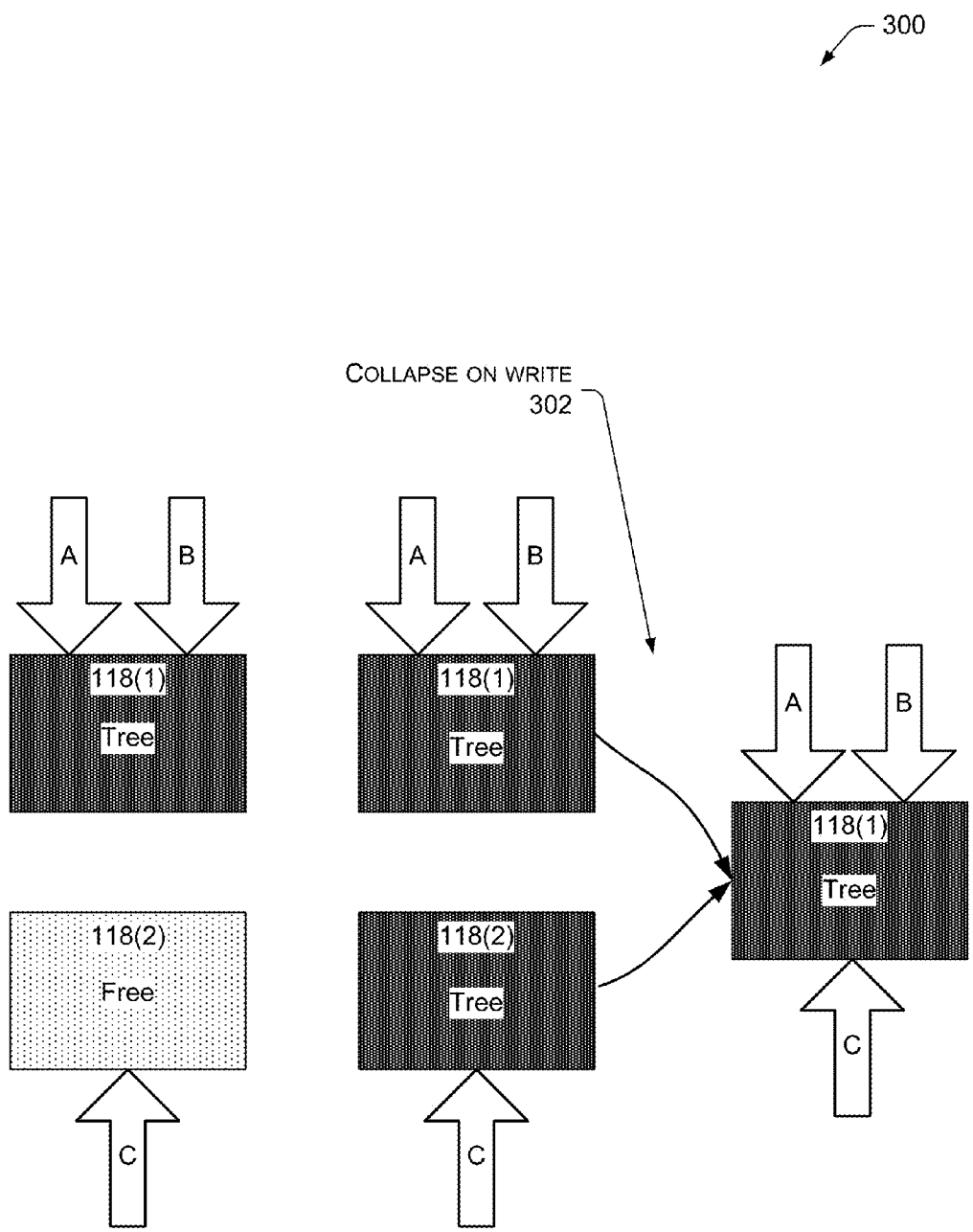
FIG. 3 illustrates a collapse on write operation and corresponding update of memory pointers.

FIG. 3 illustrates a collapse on write operation 300. As mentioned above, copy on write operations may result in increased utilization of memory pages. Over time, those memory pages 118 may be modified such that the contents of several memory pages 118 are deemed to be identical. Continuing the example from FIG. 2, as shown in FIG. 3 the contents of the memory page 118(2) have been changed from "Free" back to "Tree". As a result, the data of the memory page 118(1) and 118(2) are now identical. A collapse on write operation 302 is used to update the pointers to a primary page containing the data, and allows the now duplicative memory page 118(2) to be de-allocated.

The collapse on write operation may occur during regular operation, or be deferred to a later time. For example, the collapse on write operation may be configured to be deferred until a pre-determined level of system resources are available, such as processor time, available memory, and so forth. The collapse on write operation may also be configured to be deferred until the system enters a pre-defined condition, such as a wait state. In some implementations, the read/write flag 120 may be used to determine which pages are eligible for a deferred collapse operation.

In another implementation, evaluation as to whether the collapse on write operation is merited may occur during regular operation or be deferred to a later time as above. For example, when the system resources are being heavily utilized for other operations the determination as to whether to perform the scan to locate memory pages deemed to be identical and collapse may be deferred until a pre-determined level of system resources are available, such as processor time, available memory, and so forth.

Figure 4:
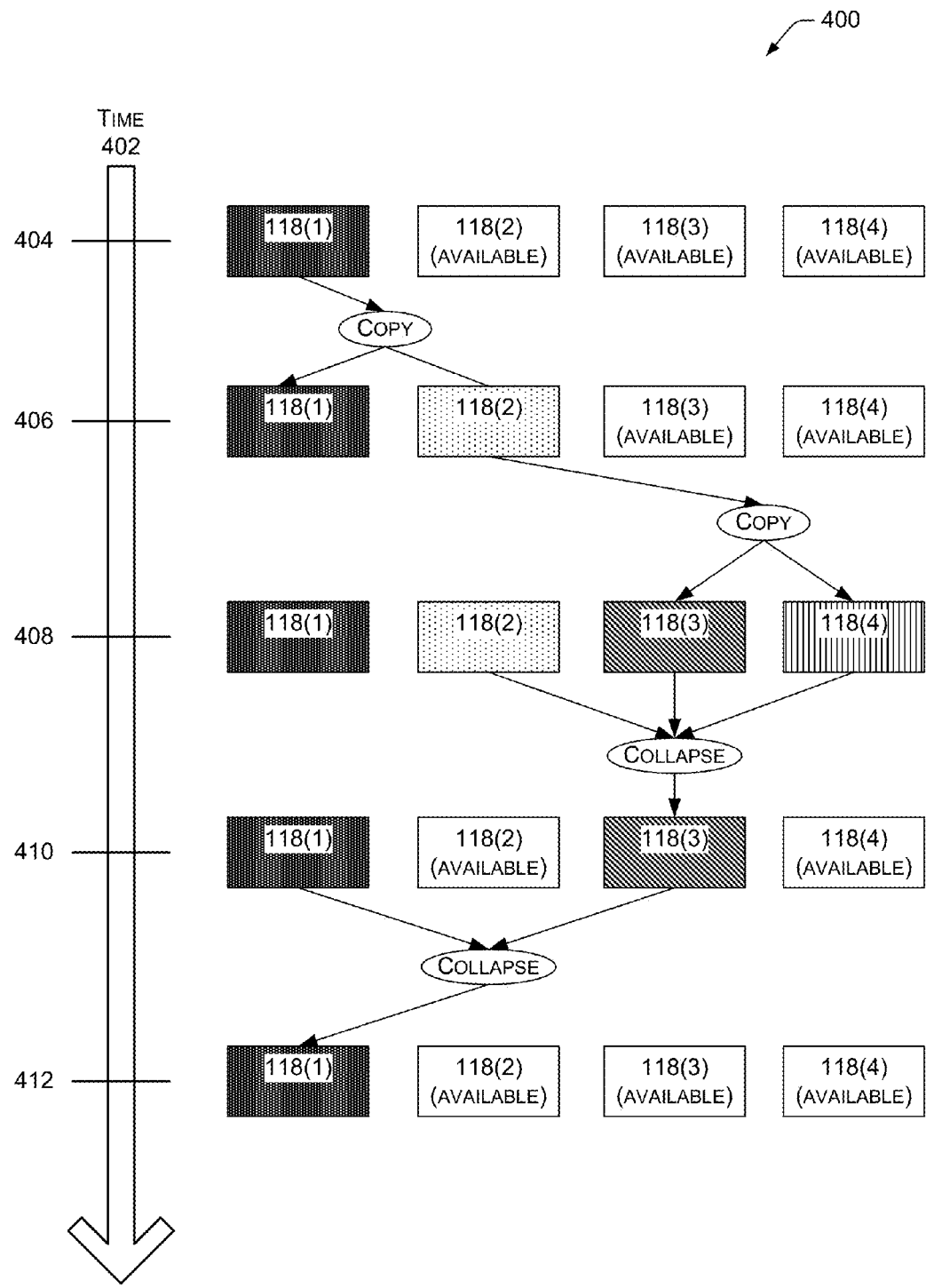
FIG. 4 illustrates copies and collapses of data over time across four memory pages.

FIG. 4 illustrates over time movement 400 of data via copies and collapses across four memory pages. In this illustration, time increases down the page as indicated by arrow 402. The following process may take place within an individual device, across multiple virtual instances, across multiple virtual and physical devices, and so forth.

At time 404, the first memory page 118(1) is in use containing data. The memory pages 118(2)-(4) are available for use, either being empty or having been de-allocated. Suppose, as shown above in FIGS. 1-3, that several processes have pointers referring to the same memory page 118. One of these processes calls to modify data within the memory page, and a copy on write operation is initiated.

At time 406, the memory page 118(1) continues to hold data, as does 118(2) which now contains a modified copy of the data originally from the memory page 118(1). Several processes then call upon the memory page 118(2), each making additional changes to the memory pages 118 which they point to.

At 408, the memory page 118(1) retains its original data, and now the memory pages 118(2)-(4) contain modified copies of that original data. Continued activity by one or more of the processes results in modification of the data such that the contents of memory pages 118(2)-(4) are identical. As a result, a collapse on write operation is initiated between memory pages 118(2)-(4).

At 410, the memory pages 118(2)-(4) have been collapsed using a collapse on write operation into the memory page 118(3). As a result, the memory pages 118(2) and 118(4) may be de-allocated and used for storage of other data. After further activity by the processes pointing to the memory pages 118, the data within the memory page 118(1) and 118(3) are now identical. Another collapse on write operation is initiated between these two pages.

At 412, the memory pages 118(1) and 118(3) have been collapsed. As a result, now only the memory page 118(1) is in use, while the remaining memory pages 118(2)-(4) remain available for storage of data.

As shown here in this illustration, over time the number of memory pages 118 storing data may increase and decrease. By using the collapse on write operation, overall memory use is reduced. This improves hardware utilization and provides significant benefits, particularly in shared or cloud computing environments where the memory may store many duplicate pieces of data within the finite number of memory pages 118.

Illustrative Processes

This disclosure describes several processes which may be implemented by the architectures described herein or by other architectures. These processes are illustrated as a collection of blocks in a logical flow graph, which represent a sequence of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the process.

Figure 5:
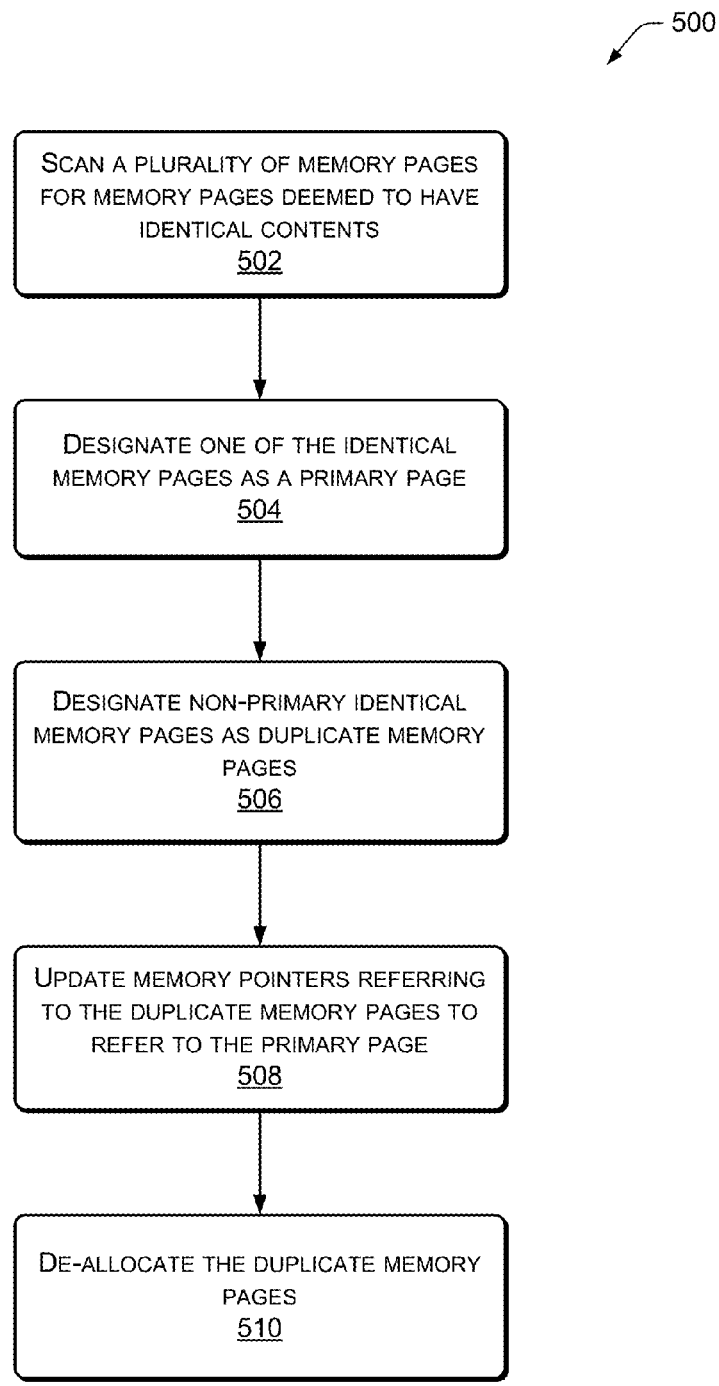
FIG. 5 is a flow diagram of an illustrative process of de-allocating memory pages with duplicative data to allow for reuse.

FIG. 5 is a flow diagram of an illustrative process 500 of de-allocating memory pages with duplicative data to allow for reuse. At 502, a plurality of memory pages 118 is scanned to identify memory pages 118 deemed to have identical contents. In some configurations, the read/write flag 120 may be used to select which memory pages are examined for duplicate data. For example, pages which have been marked as "write" indicating that they have recently been modified or are likely to be modified soon may be omitted from the scan. In some implementations, the page comparator module 108 may perform this scan.

Groups of memory pages may be allocated at the same time. For example, an application calling for memory may be allocated a group of ten memory pages. The scanning process may utilize information about group assignments to improve scanning throughput. The scan may be configured to determine if a pre-determined memory page or pages within the groups, such as the first memory page, are deemed to be identical. When the first memory pages for two groups are deemed to be identical, the more computationally expensive bitwise comparison may then be performed. However, when the first memory pages for the two groups do not match, designate the groups and memory pages therein as non-duplicate, skip those pages, and continue scanning.

In another implementation, duplicate memory pages may be determined using a content addressable memory (CAM). Pages may be directly stored in CAM, allowing direct interrogation for matches. Alternatively, a hash value for each memory page 118 may be stored in CAM along with the address of the corresponding memory page 118. Interrogation of the CAM provides memory page addresses having duplicate hashes. Duplication of data may be determined with the hash, or the hash may be used to target particular memory pages for more detailed bit match comparisons, such as described below with regards to FIG. 7.

At 504, one of the identical memory pages is designated as a primary page. For example, out of a set of memory pages 118 containing identical data, the memory page 118 with the lowest address number may be selected.

At 506, non-primary identical memory pages are designated as duplicate memory pages 118. The non-primary identical memory pages are the remainder of the set of memory pages 118 containing identical data less the primary page.

At 508, memory pointers referring to the duplicate memory pages are updated to refer to the primary page. After this update, the processes will then look to the single primary page. In some implementations, the pointer maintenance module 110 may perform this task.

At 510, the duplicate memory pages which are no longer referenced by the pointers are de-allocated. De-allocation frees the memory pages 118 up for future use in storing data. In some implementations the de-allocation may be performed by a garbage collection process, such as within an operating system or programming environment.

Figure 6:
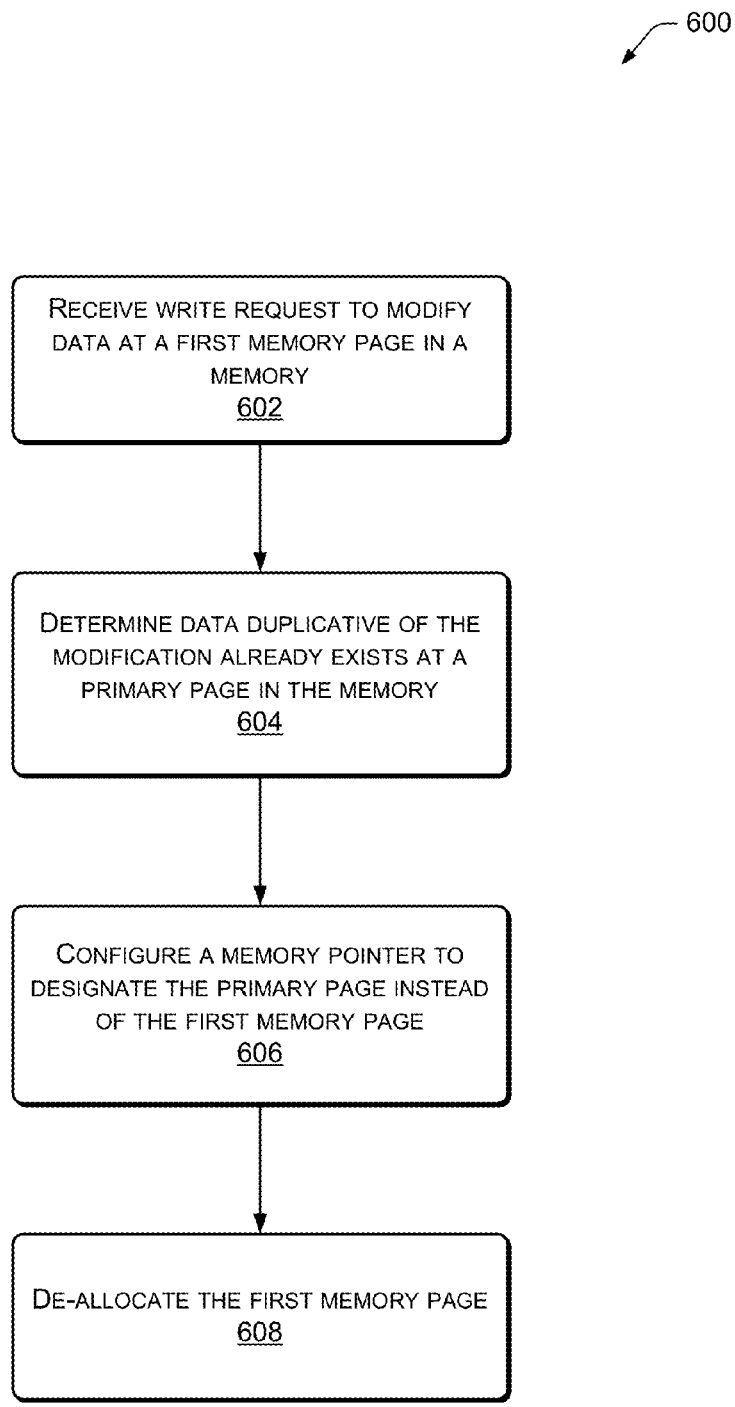
FIG. 6 is a flow diagram of an illustrative process of a collapse on write operation.

FIG. 6 is a flow diagram of an illustrative process 600 of a collapse on write operation. At 602, a write request to modify data at a first memory page 118(1) in a memory 104 is received. The write request may be received by the memory manager 106 in some implementations.

At 604, data duplicative of the requested modification which already exists at a primary page within the memory 104 is determined. This may be done using hashes, bit comparison, content addressable memory, and so forth. For example, where the modification is to change the data within the memory page from "Tree" to "Free", a primary page containing the value "Free" would be determined, such as by having a matching hash value. As described above, this function may be performed by the page comparator module 108 in some implementations.

At 606, a memory pointer 116 is configured to designate the primary page instead of the first memory page. Once the pointer has been configured, no process is looking to the first memory page. In some implementations, the pointer maintenance module 110 may perform this operation. At 608, the first memory page is de-allocated and freed for other use.

Figure 7:
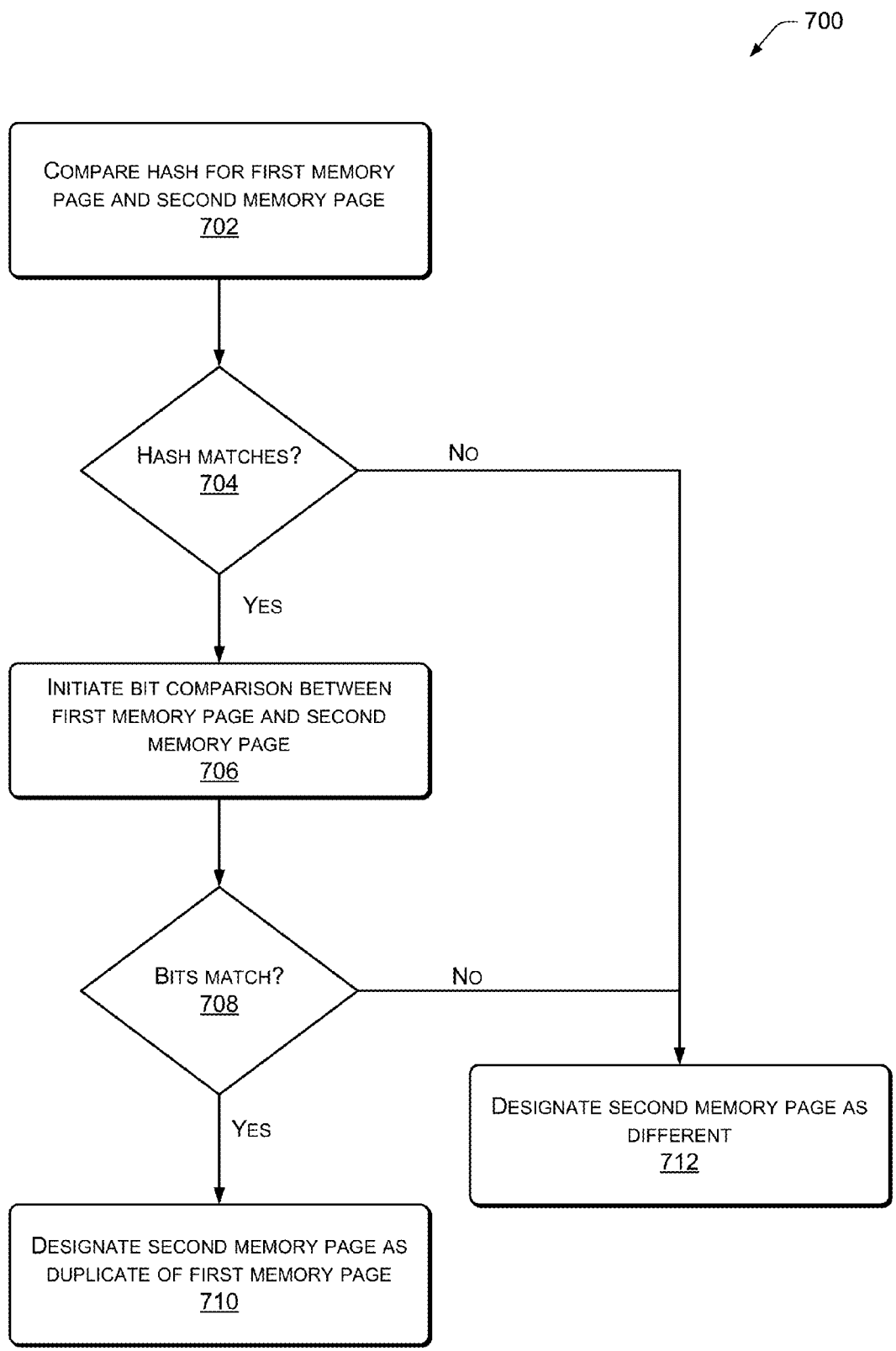
FIG. 7 is a flow diagram of an illustrative process of comparison of two or more memory pages to find duplicative data.

FIG. 7 is a flow diagram of an illustrative process 700 of comparison of two or more memory pages to find duplicative data. It is recognized that there are many ways of determining whether data between two or more memory pages is identical. What follows is one illustrative process for making this comparison.

At 702, a hash for a first memory page 118(1) and a second memory page 118(2) are compared. The memory manager 106 may be configured to generate a hash value for the contents of each memory page 118. The hash may be indicative, but may not be dispositive of a match. For example, depending upon the hash algorithm, an additional comparison may be used to confirm that the memory page 118 contents are indeed identical.

At 704, when the hashes between two or more memory pages 118 match, the process proceeds to 706. As described above, in some implementations the hash match may be determined using content addressable memory. At 706, a bit comparison between the first memory page 118(1) and the second memory page 118(2) is initiated. This bit comparison compares individual bits within the memory pages to one another. When at 708 the bits match, the process proceeds to 710. For example, where the memory pages are stored within content addressable memory, the contents of those memory pages may be directly compared to determine duplicates.

At 710, the second memory page 118(2) is designated as a duplicate of the first memory page 118(1). As described above, the memory pointers 116 currently pointing to 118(2) may be updated to point to 118(1) and the memory page 118(2) may then be de-allocated.

Returning to 704 and 708, when the hash or bits do not match, the process may proceed to 712. At 712, the second memory page 118(2) is designated as different. For example, a single bit may vary between the two memory pages 118 undergoing comparison.

Figure 8:
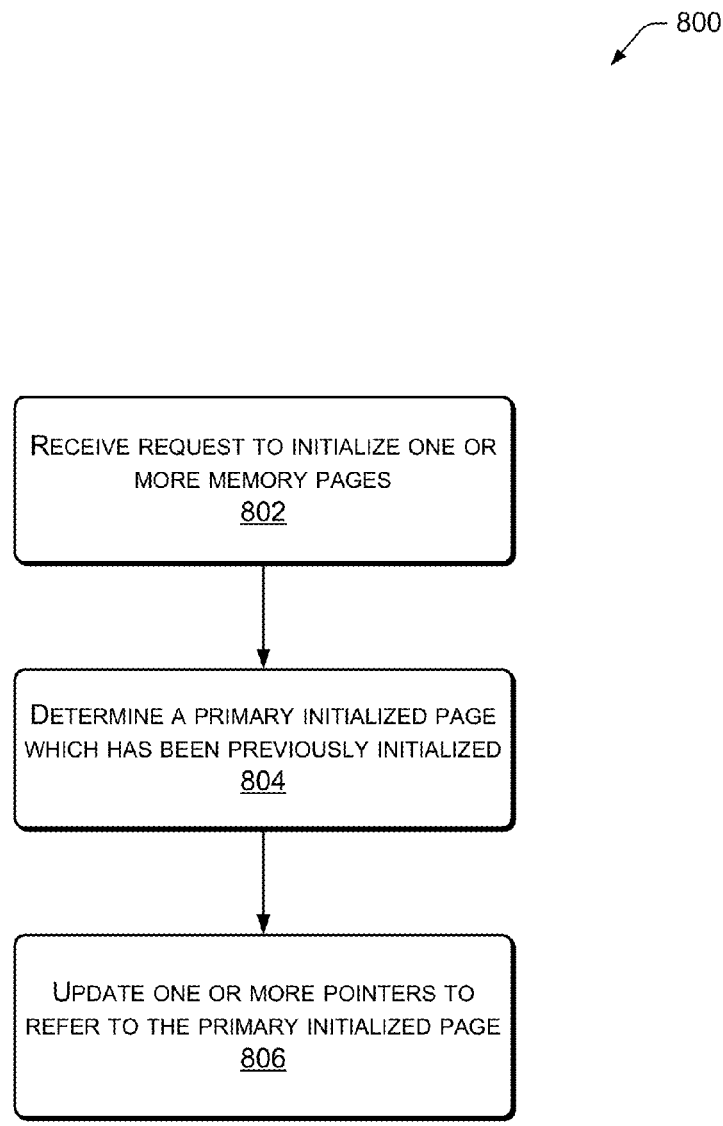
FIG. 8 is a flow diagram of an illustrative process of using a shared previously initialized memory page.

FIG. 8 is a flow diagram of an illustrative process 800 of using a shared previously initialized memory page. As described above, many processes during execution will initialize one or more blocks of memory, particularly at instantiation. For example, initialization may involve setting the entire memory page to zeros. This allows the process to start with memory in a known, clean state, preventing erroneous program execution, data errors, and so forth which may occur when the process begins to use a previously used memory page 118.

In environments such as shared or cloud computing resources, there may be many instances of the same process which are executing. Consider an example where there are 1,000 copies of the same process executing, and that upon instantiation each process reserves and initializes 1,000 memory pages 118. This would typically lead to an initial memory usage of 1,000,000 memory pages 118.

As mentioned above, in some implementations pages may be deemed identical when a match of the contents of the memory pages indicates the contents are the same. For example, a first memory page may store "0010" while a second memory page stores "0010". In this example the first and second memory pages may be deemed identical because they contain the same data. However, a third memory page containing "0011" would not be identical with the first and second memory pages because the last digit differs.

In another implementation, memory pages may be deemed identical when the contents of those memory pages exceed a pre-determined threshold of correspondence. For example, where the first memory page stores "0010" and the second memory page stores "0011", three out of four bits are identical within the two memory pages. The page comparator 108 may be configured such that the two memory pages are deemed identical when the correspondence between the bits exceed the pre-determined threshold value of 75%.

In yet another implementation the page comparator 108 may be configured to disregard one or more bits in particular positions within each memory page. For example, the page comparator 108 may be configured to disregard the last bit in each memory page. Continuing our example, the first and second memory pages above would thus be deemed identical because the first three positions store "001".

The process 800 minimizes the amount of memory used for initializations. At 802, a request to initialize one or more memory pages is received. The initialization may comprise setting data storage locations within the memory page to a pre-determined initialization value. For example, a process may be calling for 1,000 memory pages with initial data of all zeroes therein. In other implementations, the pre-determined initialization value may be a particular value, pattern of values, and so forth. For example, the memory pages may be initialized to contain some zero values and some values suitable for debugging.

At 804, a previously initialized primary initialized page is determined. For example, the memory page 118(1) may have been previously initialized and contains all zeroes and designated at the primary initialized page.

At 806, one or more pointers are updated to refer to the primary initialized page. Continuing the example, the pointers 116 associated with the process would be set so that all 1,000 pointers refer to the memory page 118(1). By using this process a single memory page is reused rather than consuming 1,000 memory pages to instantiate the process. When data is to be written to the address designated by the pointer, a copy on write operation may then take place and the data written to the second copy.

Figure 9:
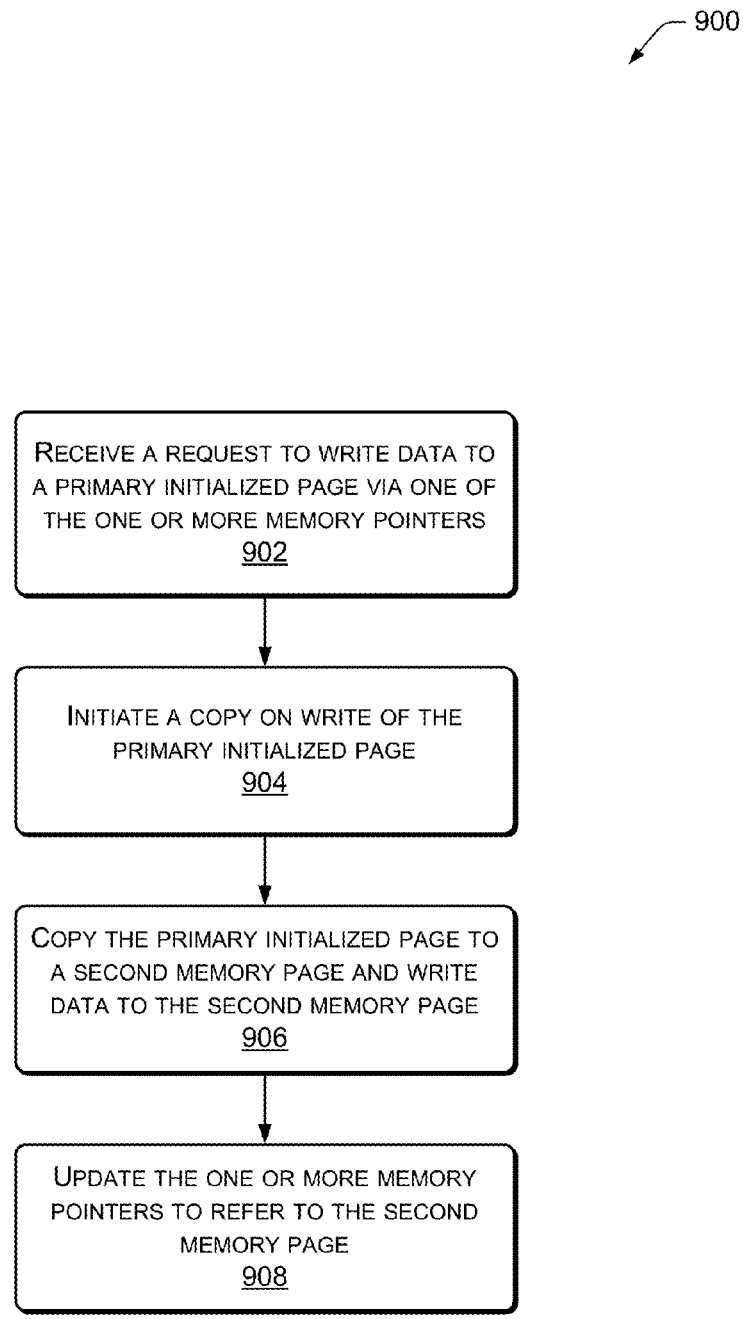
FIG. 9 is a flow diagram of an illustrative process of writing data to a shared previously initialized memory page.

FIG. 9 is a flow diagram of an illustrative process 900 of writing data to a shared previously initialized memory page. As described above, one or more memory pages 118 may be designated as a primary initialized page. This may be the memory page 118 which contains all zeroes, all ones, or another pre-determined initialized pattern.

At 902, a request is received to write data to the primary initialized page via one of the one or more memory pointers 116. For example, one of the processes may begin accepting data from a user and need to store the data for further processing.

At 904, a copy on write of the primary initialized page to a second memory page is initiated. At 906, the primary initialized page is copied to a second memory page and data is written to the second memory page. At 908, one or more of the memory pointers are updated to refer to the second memory page. In some implementations, the initialized memory pages 118 may be initialized and then a collapse on write operation may be performed.

CONCLUSION

Although specific details of illustrative methods are described with regard to the figures and other flow diagrams presented herein, it should be understood that certain acts shown in the figures need not be performed in the order described, and may be modified, and/or may be omitted entirely, depending on the circumstances. As described in this application, modules and engines may be implemented using software, hardware, firmware, or a combination of these. Moreover, the acts and methods described may be implemented by a computer, processor or other computing device based on instructions stored on one or more computer-readable storage media.

What is claimed is:

1. A computer-readable storage media storing instructions that, when executed, instruct a processor to perform acts comprising:
    associating a first virtual memory address pointer to a first memory page of a random access memory (RAM) and a second virtual memory address pointer to a second memory page of the RAM;
    identifying one or more flagged memory pages of a plurality of memory pages, the one or more flagged memory pages associated with a flag that indicates that the corresponding page has been modified within a pre-determined interval of time;
    identifying a plurality of target memory pages of the plurality of memory pages, the target memory pages excluding the one or more flagged memory pages and including at least the first memory page and the second memory page;
    scanning the plurality of target memory pages for memory pages deemed to have identical contents;
    identifying, based at least in part on the scanning, that the first memory page and the second memory page have contents that are deemed to be identical to one another;
    designating the first memory page as a primary page;
    designating the second memory page as a duplicate page; and
    updating the second virtual memory address pointer referring to the second memory page to refer to the first memory page.

2. The computer-readable storage media of claim 1, further comprising de-allocating the second memory page.

3. The computer-readable storage media of claim 1, wherein the scanning comprises comparing hashes of the target memory pages.

4. The computer-readable storage media of claim 3, wherein the comparing hashes comprises querying a content addressable memory storing the hashes.

5. The computer-readable storage media of claim 1, wherein the scanning comprises:
    identifying one or more updated memory pages of the one or more flagged memory pages, individual ones of the one or more updated memory pages indicating that a corresponding page has not been modified within the pre-determined interval of time; and
    scanning the updated memory pages.

6. The computer-readable storage media of claim 1, wherein the pre-determined interval comprises a pre-determined number of memory access cycles.

7. The computer-readable storage media of claim 1, wherein the pre-determined interval is tracked using a timer configured to reset to a pre-determined value in response to a write request.

8. A system comprising:
    a processor;
    a random access memory (RAM), coupled to the processor; and
    a memory manager module, coupled to the processor and coupled to the RAM, the memory manager module configured to:
        associate a first address pointer to a first memory location of the RAM and a second address pointer to a second memory location of the RAM;
        identify one or more flagged memory locations associated with a flag that indicates that a corresponding memory location is being read from or written to;
        identify target memory locations excluding the one or more flagged memory locations, the target memory locations including at least the first memory location and the second memory location;
        scan the target memory locations for memory locations deemed to have identical contents;
        identify, based at least in part on the scanning, that the first memory location and the second memory location have contents that are deemed to be identical to one another;
        designate the first memory location as a primary location;
        designate the second memory location as a duplicate location; and
        update the second address pointer referring to the second memory location to refer to the first memory location.

9. The system of claim 8, wherein the memory management module is further configured to de-allocate the second memory location.

10. The system of claim 8, wherein the scanning comprises comparing hashes of the target memory locations.

11. The system of claim 10, wherein the comparing hashes comprises querying a content addressable memory storing the hashes.

12. The system of claim 8, wherein the scanning comprises:
    identifying one or more updated memory locations of the one or more flagged memory pages, individual ones of the one or more updated memory pages indicating that a corresponding location is no longer being read from or written to; and
    scanning the updated memory locations.

13. The system of claim 8, wherein the flag indicates that the corresponding memory location has been modified within a pre-determined interval of time wherein the pre-determined interval comprises a pre-determined number of memory access cycles.

14. A method comprising:
    identifying flagged memory pages of a Random Access Memory (RAM), the flagged memory pages associated with a flag indicating that a corresponding memory page has been modified within a pre-determined interval of time;
    scanning target memory pages of the RAM for memory pages deemed to have identical contents, the target memory pages excluding the flagged memory pages;
    identifying, based at least in part on the scanning, identical memory pages having contents that are deemed to be identical to one another; and
    updating one or more address pointers referencing individual ones of the identical memory pages to reference a primary page of the identical memory pages.

15. The method of claim 14, the method further comprising de-allocating one or more of the identical memory pages.

16. The method of claim 14, wherein the scanning comprises comparing hashes of content stored at the target memory pages.

17. The method of claim 16, wherein the comparing hashes comprises querying a content addressable memory storing the hashes.

18. The method of claim 14, wherein the scanning comprises:
  identifying one or more updated memory pages of the one or more flagged memory pages, individual ones of the one or more updated memory pages indicating that a corresponding page has not been modified within the pre-determined interval of time; and
  scanning the updated memory pages.

19. The method of claim 14, wherein the pre-determined interval is tracked using a timer configured to reset to a pre-determined value in response to a write request.

20. One or more computer-readable storage media encoded with instructions that, when executed by one or more processors, causes the one or more processors to perform acts comprising:
  identifying one or more flagged memory pages of a Random Access Memory (RAM), the one or more flagged memory pages associated with a flag indicating that a corresponding memory page has been modified within a pre-determined interval of time;
  scanning target memory pages of the RAM for memory pages deemed to have identical contents, the target memory pages excluding the flagged memory pages;
  identifying, based at least in part on the scanning, identical memory pages having contents that are deemed to be identical to one another; and
  updating one or more address pointers referencing individual ones of the identical memory pages to reference a primary page of the identical memory pages.

21. The one or more computer-readable storage media of claim 20, further comprising de-allocating one or more of the identical memory pages.

22. The one or more computer-readable storage media of claim 20, wherein the scanning comprises comparing hashes of content stored at the target memory pages.

23. The one or more computer-readable storage media of claim 20, wherein the scanning comprises:
  identifying one or more updated memory pages of the one or more flagged memory pages, individual ones of the one or more updated memory pages indicating that a corresponding page has not been modified within the pre-determined interval of time; and
  scanning the updated memory pages.

24. The one or more computer-readable storage media of claim 20, wherein the pre-determined interval is tracked using a timer configured to reset to a pre-determined value in response to a write request.

* * * * *